(12) United States Patent  (10) Patent No.: US 6,244,397 B1
Kars  (45) Date of Patent: Jun. 12, 2001

(54) DOUBLE-ACTING SHOCK ABSORBER WITH VOLUME COMPENSATION FOR THE STROKE OF THE ROD

(75) Inventor: Jan Willem Kars, Mijnsheerenland (NL)

(73) Assignee: Koni B.V. (NL)

( * ) Notice: Subject to any disclaimer, the term of this patent is extended or adjusted under 35 U.S.C. 154(b) by 0 days.

(21) Appl. No.: 09/381,026
(22) PCT Filed: Apr. 3, 1998
(86) PCT No.: PCT/NL98/00185
  § 371 Date: Sep. 10, 1999
  § 102(e) Date: Sep. 10, 1999
(87) PCT Pub. No.: WO98/45614
  PCT Pub. Date: Oct. 15, 1998

(30) Foreign Application Priority Data

Apr. 8, 1997 (NL) .................................................. 1005765

(51) Int. Cl.[7] ...................................................... F16F 9/18
(52) U.S. Cl. ............................................................ 188/315
(58) Field of Search .................................. 188/297, 313, 188/315, 314; 267/124

(56) References Cited

U.S. PATENT DOCUMENTS

| 1,727,121 | 9/1929 | Haines . |
| 2,057,893 | 10/1936 | Gross . |
| 2,533,226 | 12/1950 | Davis et al. . |
| 2,649,936 | 8/1953 | Crabtree . |
| 2,728,419 | 12/1955 | Crabtree . |
| 5,924,528 | * 7/1999 | Vermolen ........................ 188/266.1 |

FOREIGN PATENT DOCUMENTS

| 509363 | 3/1952 | (BE) . |
| 3932287 | 4/1991 | (DE) . |
| 3934386 | 4/1991 | (DE) . |
| 0220370 | 5/1987 | (EP) . |
| 0607545 | 7/1994 | (EP) . |
| 2132313 | 7/1984 | (GB) . |

* cited by examiner

Primary Examiner—Christopher P. Schwartz
Assistant Examiner—C. T. Bartz
(74) Attorney, Agent, or Firm—Bachman & LaPointe, P.C.

(57) ABSTRACT

Double-acting shock absorber, comprising a piston-cylinder shock absorber which is known from the prior art. During the reciprocating movement of the piston, which is provided on one side with a piston rod which extends to outside the cylinder, an interplay of forces of different magnitudes is generated in the different directions of movement. This is caused by the fact that the surface area on which the liquid situated in the shock absorber acts is smaller on that side of the piston rod which has the surface of the piston rod than on the other side of the piston. According to the invention, these forces are made substantially equal by connecting said other side of the piston to a compensation chamber of variable volume which essentially corresponds to the instantaneous volume displaced by the piston rod in the cylinder.

9 Claims, 2 Drawing Sheets

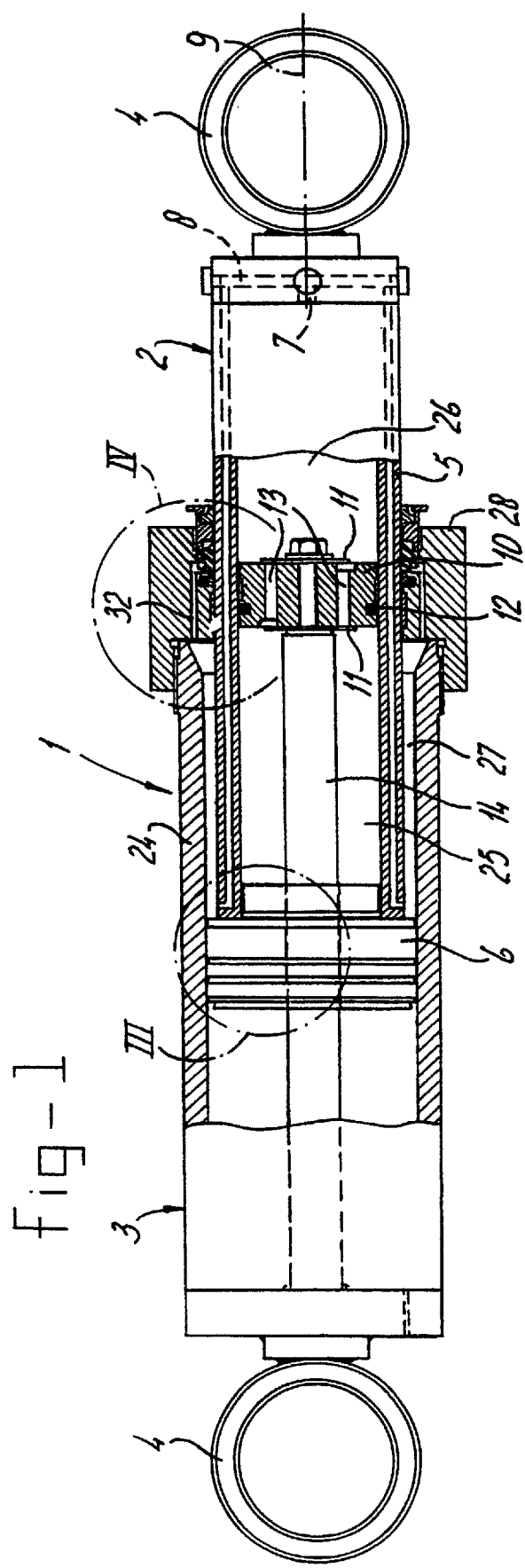
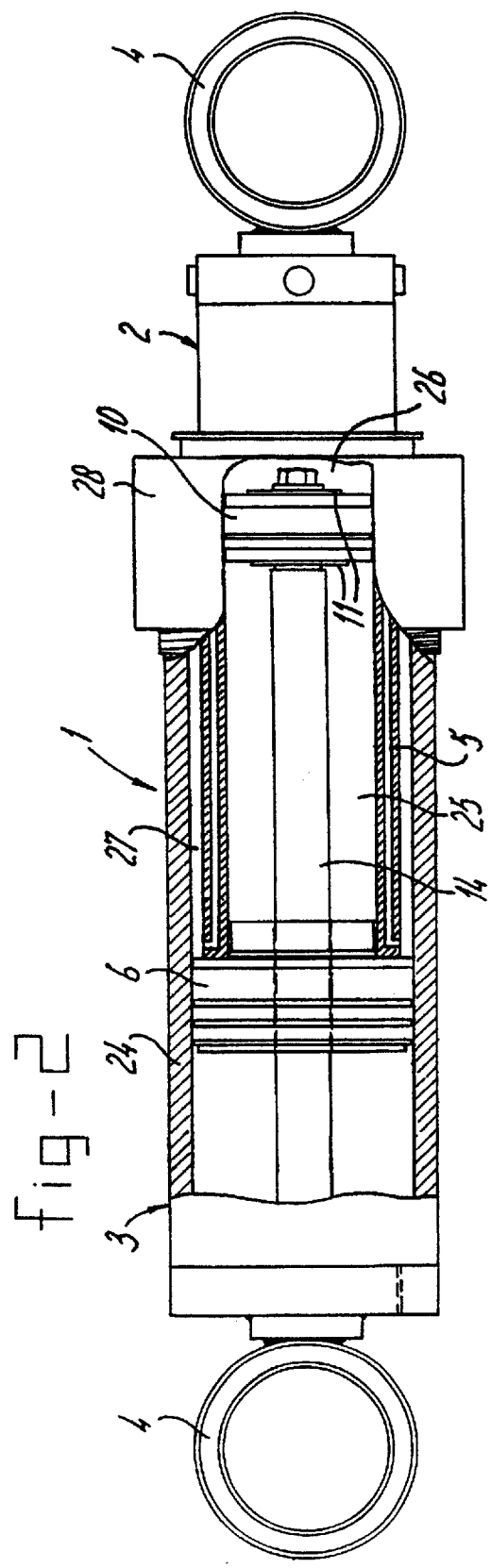

DOUBLE-ACTING SHOCK ABSORBER WITH VOLUME COMPENSATION FOR THE STROKE OF THE ROD

The present invention relates to a double-acting shock absorber according to the preamble of claim 1.

Shock absorbers of this kind are generally known in the prior art and are used for damping all kinds of vibrating, oscillating and impact movements. The interplay of forces during the inwards and outwards strokes is not symmetrical in such cases, since the first chamber contains the piston rod, with the result that the surface area of liquid which acts on that side of the piston is less than the effective surface area of the second chamber. In order to avoid this drawback, it has been proposed in the prior art to lengthen the piston rod, so that it always extends completely through the cylinder. This has the drawback that it is necessary to provide further sealing means at the location of that part of the piston rod which projects out of the cylinder but has no further function. Moreover, with a design of this nature it is no longer possible to arrange fastening means, such as eyelets, on the axis of the stroke movement. Fastening means of this kind then have to be arranged on the side. Consequently, on the one hand more space is required, and on the other hand the transmission of forces is less effective, due to the fact that a moment is generated. For this reason, in many applications the drawback of the unequal effective surface area on opposite sides of the piston is accepted, or else the fastening means is displaced so far into the axis that the emerging piston rod meets no longer any obstruction.

However, in the art shock absorbers are increasingly being used for damping movements of very low amplitude, i.e. movements of an amplitude which is significantly less than 1 cm, being in the order of magnitude of millimetres. A very rigid shock absorber is needed in such cases if optimum shock absorption is to be achieved. Since the shock absorber is dimensioned on the basis of the minimum damping which it has to carry out, i.e. that with the smallest piston surface area, i.e. where the piston rod is situated, this situation means that the shock absorber has to be oversized, for the shock absorber has to be calculated on the basis of the highest load occurring, which is generated by that surface of the piston which lies on the opposite side. This design of increased weight runs counter to the desire to provide more lightweight structures, and is no longer acceptable in certain applications.

From U.S. Pat. No. 2,057,893 A a shock absorber is known in which some compensation is realized by providing a third chamber having a changeing volume. The volume of this third chamber increases as the piston rod moves further into the first chamber and the third chamber is in communication with the second chamber. Because this is a gas filled shock absorber a further compensation is obtained by the gas inside the absorber.

The object of the present invention is to avoid the drawback described above and to provide a double-acting shock absorber which saves space, can be of optimum design for both the inwards and outwards stroke with regard to the strength thereof, and in which moreover it is possible to attach the fastening means at any desired location. Furthermore full compensation of the volume of the piston rod is aimed.

This object is achieved in a double-acting shock absorber as described above with the characterising features of claim 1. The presence of a third chamber provides compensation for the presence of the piston rod. This means that in the event of equal loading during the inwards and outwards stroke, equal forces are generated inside the shock absorber. This is important in particular for shock absorbers which execute a short stroke and therefore have to be particularly (oil)rigid.

The volume of the third chamber, and more particularly the change thereof, is always essentially equal to the change in volume in the first chamber caused by the inward or outward movement of the piston rod. This means that the total volume of the first and second chambers remains constant despite the inward or outward movement of the piston rod, owing to the change in volume of the third chamber. Volume compensation of this nature can be achieved particularly easily if the third chamber is also delimited by the first and second parts, i.e. its "length" also changes when the first and second parts move with respect to one another. By then selecting the surface area to be equal to the surface area of the piston rod, it is possible to provide complete compensation for the volume of the piston rod.

According to an advantageous embodiment of the invention, the cylinder is externally provided with a plunger, and the second part is provided with a cylindrical circumferential part, which is designed to interact with the plunger and is provided, in the region of a free end, with further sealing means, in order to delimit the third chamber therebetween.

In such a case, the exterior of the cylinder, i.e. of the first part, can function as a plunger rod for the plunger, with the circumferential part of the second part being provided with suitable sealing means. The above-described plunger and the conventional sealing means for the conventional piston rod can form a unit. Moreover, expansion-compensation means for the shock-absorber liquid may be arranged therein. This is because this liquid will expand slightly when heated, a fact which is noticeable particularly in the case of relatively rigid shock absorbers and has to be compensated for.

The actual shock absorber itself, i.e. the piston-cylinder assembly, may be designed in any manner which is known from the prior art. This relates in particular to the design of the passages for the oil, which may be provided with valves which are optionally externally actuable. Electrical adjustment is possible, and it is also possible to provide a volume of gas in order to assist the functioning of the liquid.

It is stated above that the shock absorber according to the invention can be used on any structure according to the prior art where it is necessary to provide damping between two moving parts. In particular, this shock absorber can be used as a vibration or rotation absorber for wheel sets, and more particularly wheel sets which are used in railways.

The invention will be explained in more detail below with reference to an exemplary embodiment which is illustrated in the drawing, in which:

FIG. 1 shows a cross-section through the shock absorber according to the invention;

FIG. 2 shows the shock absorber in accordance with FIG. 1 with the piston moved further inwards;

In FIG. 1, 1 denotes the shock absorber according to the invention, in a first position. This shock absorber comprises a first part 2 and a second part 3, which can be moved in a reciprocating manner with respect to one another. With the aid of fastening eyelets 4, the ends of the shock absorber parts can be fastened to a vehicle. As a non-limiting example, it is possible to mention attachment of a bogie to the chassis or frame of a railway vehicle, in order to absorb vibrational movements of wheel sets as far as possible.

Figure 3:
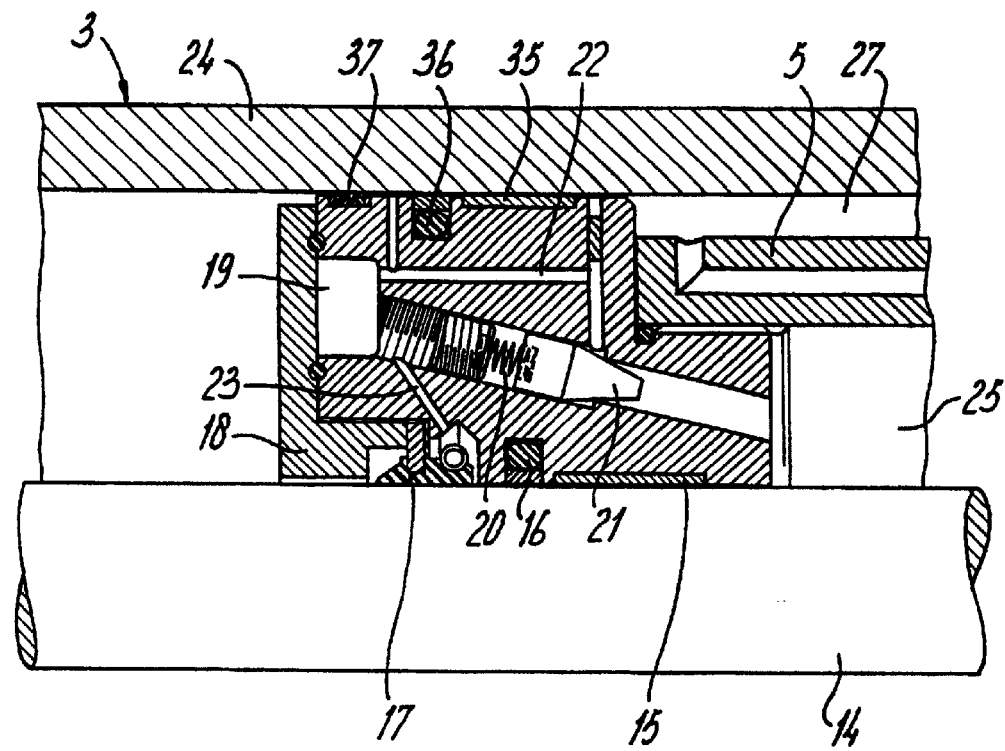
FIG. 3 shows detail III from FIG. 1 on an enlarged scale.

The first part 2 comprises a cylinder 5 and is provided at the end with a sealing stop 6, more details of which can be seen in FIG. 3. At the end of cylinder 5 there is arranged an opening 7 which adjoins bores 8. The second part 2 is provided with a piston 10 which is arranged in cylinder 5. This piston 10 is provided with spring-loaded valves 11, which shut off ducts 13. Moreover, piston 10 is provided with a seal 12. Details of this piston are not important to the present application and may comprise any structure which is known from the prior art. Via piston rod 14, piston 10 is connected to eyelet 4. It can be seen from FIG. 3 that the sealing stop 6 is provided with a bearing bush 15 over which piston rod 14 runs. A first, high-pressure seal is denoted by 16, while the second, low-pressure seal is denoted by 17. Moreover, there is a compensation device in sealing stop 6 which compensates for expansion and/or contraction of the volume of liquid as a result of a rise in temperature. This compensation device comprises a compensation chamber 19, which is delimited by-sealing stop 6 and retaining ring 18. This compensation chamber is connected to a duct 22 which is closed off by a piston 21 which is spring-loaded by means of spring 20. The strength of spring 20 is selected in such a manner that in normal operation piston 21 will never move far enough for liquid to be able to pass into chamber 19. Moreover, there is a vacuum system (not shown in more detail), with the result that not only can liquid flow out of first chamber 25 in the event of high pressure in the compensation chamber 19, but also, in the event of reduced pressure, i.e. cooling, liquid can flow back. It is clear that chamber 19 will be partly filled with a pressurized gas. Duct 23 is present in order to return leaked liquid which is situated between high-pressure sealing ring 16 and low-pressure sealing ring 17 to the system, in order in this way to prevent leakage.

Figure 4:
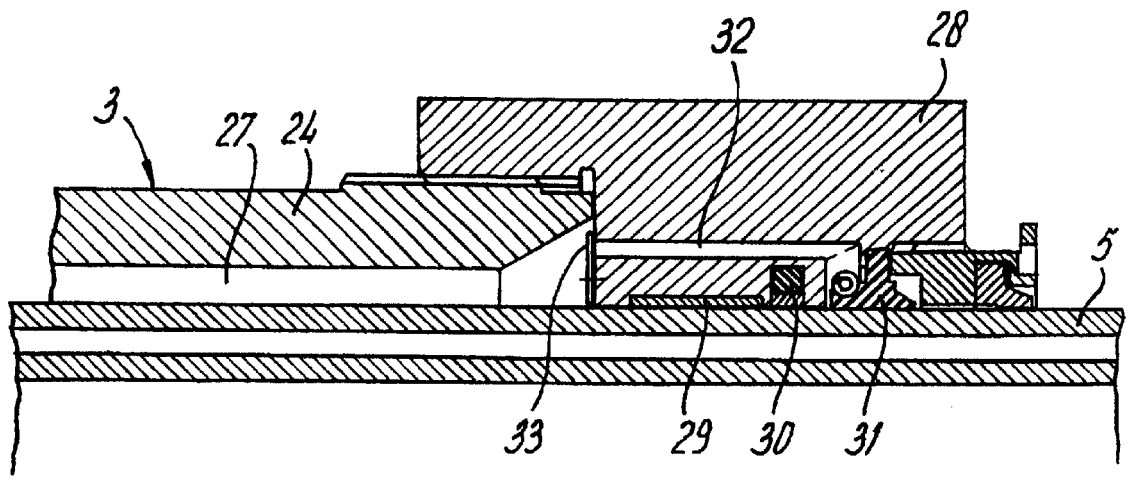
FIG. 4 shows detail IV from FIG. 1 on an enlarged scale.

A cylindrical circumferential part 24 also forms part of the second part 3. This is dimensioned in such a manner that the outer part of sealing stop 6, which acts as a plunger, is held in a sealing manner. For this purpose, this outer part of sealing stop 6, as can be seen from FIG. 3, is provided with a bearing surface 35, a high-pressure seal 36 and a low-pressure seal 37. In this case too, a return duct which opens out into pressure-compensation chamber 19 is arranged between the high-pressure seal and the low-pressure seal. The free end of the cylindrical circumferential part 24 is provided with a sealing bush 28, for example by means of a screw connection (FIG. 4). This sealing bush is also provided with a bearing surface 29, a high-pressure sealing ring 30, a low-pressure sealing ring 31 and a return duct 32 which extends between the two sealing rings. This return duct opens out into a spring-loaded valve 33. Sealing bush 28, and more particularly the parts which have just been described, are designed to run over the outer surface of cylinder 5. The third chamber 27 is delimited in the part between sealing bush 28 and sealing stop 6. Piston 10 delimits, on one side, the first chamber 25 which has already been mentioned above and, on the other side, the chamber 26. Via opening 7, bore'8 provides a connection between second chamber 26 and third chamber 27.

The surface area of the third chamber 27, i.e. the surface area of the annular part which extends perpendicular to the axis 9, is essentially equal to the cross-sectional surface area of the piston rod 14.

On comparing FIGS. 1 and 2, it will be seen that as the piston 10 moves further inwards into cylinder 5, the volume of second chamber 26 on the one hand decreases owing to the inward movement of this piston, but on the other hand apparently increases, owing to the fact that-some of the fluid can flow out into the third chamber 27, which becomes larger. The extent to which this third chamber 27 becomes larger corresponds precisely to the increased volume of the piston rod 14 which is situated in the first chamber 25.

In this way, the forces generated in the liquid in the event of tensile or compressive movements between the fastening eyelets 4 can be made equal, due to the fact that uniform loading of the shock absorber is provided, so that the latter can function optimally. This is particularly, although not exclusively, important for shock absorbers which have a relatively short stroke of, for example, 1–2 mm.

Although the invention is described above with reference to a preferred embodiment, it will be understood that numerous modifications can be made to this embodiment. For the sake of simplicity, the control arrangement for the shock absorption is positioned in the piston. It will be understood that it may also be arranged at any other location in the shock absorber and moreover can be designed so that it can be adjusted in any desired manner (electrically). Moreover, the third chamber can be realized in some other manner, while the remaining components can be modified in ways which are generally known in the prior art. Moreover, it is possible to eliminate any problems which may arise from the excessively fixed design of the structure by employing a floating, hydraulically balanced piston at the location of the attachment of the piston rod 14 to the second part 3. All variations of this nature are considered to lie within the scope of the appended claims.

What is claimed is:

1. Double-acting shock absorber, comprising:
   a first part, which is provided with fastening means for fastening to a first component of a vehicle and comprises a cylinder,
   a second part, which is provided with fastening means for fastening to a second component of said vehicle and comprises a piston, which is designed to move inside said cylinder and thus delimits, on opposite sides of the piston, a first chamber and a second chamber, a piston rod, which is situated in said first chamber, being arranged between said fastening means of said second part and said piston,
   a liquid which is arranged in said first and second chamber for transmitting forces from said piston to said cylinder, or vice versa,
   flow ducts, which allow movement of said liquid from the first chamber to the second chamber, or vice versa,
   a third chamber delimited between said first and second parts, the volume of which third chamber increasing as the piston rod moves further into the first chamber, and which third chamber is in communication with the second chamber, the volume of the third chamber is defined by the surface area which extends perpendicular to the stroke movement of the piston and by the path covered by the piston rod, said surface area being substantially equal to the surface area of the piston rod perpendicular to its direction of movement.

2. Shock absorber according to claim 1, in which the outside of the cylinder is provided with a plunger, and the second part is provided with a cylindrical circumferential part, which is designed to interact with said plunger and is provided, in the region of a free end, with sealing means, in order to delimit said third chamber therebetween.

3. Shock absorber according to claim 2, in which the outside of the cylinder is designed as a plunger rod in order to act on said sealing means.

4. Shock absorber according to claim 1, in which said communication between the third chamber and the second chamber comprises a bore which extends in the wall of the cylinder of the first part.

5. Shock absorber according to claim 2, in which said plunger comprises an integrated unit, in which there are arranged expansion-compensation means for liquid.

6. Shock absorber according to claim 1, in which said piston is provided with flow valve controlled flow ducts.

7. Shock absorber according to claim 1, in which the passage through said flow ducts can be externally influenced by electrical means.

8. Shock absorber according to claim 1, with an effective stroke of less than 1 cm.

9. Shock absorber in a railway vehicle, according to claim 1, to absorb vibrating movements between a bogie and a chassis.

* * * * *